(12) United States Patent
Tani et al.

(10) Patent No.: US 11,542,620 B2
(45) Date of Patent: Jan. 3, 2023

(54) STEEL SHEET FOR CONTAINERS AND METHOD FOR PRODUCING STEEL SHEET FOR CONTAINERS

(71) Applicant: NIPPON STEEL CORPORATION, Tokyo (JP)

(72) Inventors: Yoshiaki Tani, Tokyo (JP); Shigeru Hirano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/967,642

(22) PCT Filed: Feb. 8, 2019

(86) PCT No.: PCT/JP2019/004740
§ 371 (c)(1),
(2) Date: Aug. 5, 2020

(87) PCT Pub. No.: WO2019/156245
PCT Pub. Date: Aug. 15, 2019

(65) Prior Publication Data
US 2021/0254235 A1    Aug. 19, 2021

(30) Foreign Application Priority Data

Feb. 9, 2018    (JP) .............................. JP2018-022296

(51) Int. Cl.
*C25D 5/10*    (2006.01)
*C25D 11/38*    (2006.01)
(Continued)

(52) U.S. Cl.
CPC .............. *C25D 11/38* (2013.01); *B32B 15/04* (2013.01); *B65D 65/42* (2013.01);
(Continued)

(58) Field of Classification Search
None
See application file for complete search history.

(56) References Cited

U.S. PATENT DOCUMENTS

| | | | |
|---|---|---|---|
| 4,617,095 A | 10/1986 | Tomaszewski | |
| 6,004,448 A | 12/1999 | Martyak | |

(Continued)

FOREIGN PATENT DOCUMENTS

| | | |
|---|---|---|
| JP | 2016-505708 A | 2/2016 |
| WO | WO 2014/079910 A1 | 5/2014 |

(Continued)

OTHER PUBLICATIONS

"Specular glossiness—Methods of measurement", JIS Z 8741, 1997, total 5 pages.
Wint el al., "The corrosion of chromium based coatings for packaging steel," Electrochimica Acta, vol. 203, 2016 (Available online Jan. 16, 2016), pp. 326-336.

*Primary Examiner* — Seth Dumbris
*Assistant Examiner* — Kim S. Horger
(74) *Attorney, Agent, or Firm* — Birch, Stewart, Kolasch & Birch, LLP

(57) ABSTRACT

A steel sheet for a container according to the present invention includes: a base steel sheet; a metal chromium layer; and a chromium-containing layer, in which the metal chromium layer is located on at least one surface of the base steel sheet, the chromium-containing layer is located on the metal chromium layer and contains a granular trivalent chromium compound, or contains a granular trivalent chromium compound and granular metal chromium, the metal chromium layer and the chromium-containing layer are separately disposed in two layers on the base steel sheet, in the chromium-containing layer, an average particle size of the trivalent chromium compound and the metal chromium is 10 nm or more and 100 nm or less, and an adhesion (Continued)

amount of the chromium-containing layer is 1.0 mg/m² or more and 100 mg/m² or less in terms of a Cr content.

8 Claims, 2 Drawing Sheets

(51) Int. Cl.
*B65D 65/42* (2006.01)
*B32B 15/04* (2006.01)

(52) U.S. Cl.
CPC .................. *B32B 2255/205* (2013.01); *Y10T 428/12583* (2015.01); *Y10T 428/12854* (2015.01); *Y10T 428/12972* (2015.01)

(56) References Cited

U.S. PATENT DOCUMENTS

| | | | |
|---|---|---|---|
| 2014/0004380 A1* | 1/2014 | Holzapfel | C04B 28/346 |
| | | | 428/667 |
| 2017/0081773 A1* | 3/2017 | Wijenberg | C25D 7/0621 |
| 2018/0138468 A1* | 5/2018 | Ibaragi | H01M 50/116 |
| 2018/0355496 A1 | 12/2018 | Nakagawa et al. | |

FOREIGN PATENT DOCUMENTS

| | | | | |
|---|---|---|---|---|
| WO | WO 2015/177314 A1 | 11/2015 | | |
| WO | WO-2016163483 A1 * | 10/2016 | ............. | H01G 11/78 |
| WO | WO 2017/098994 A1 | 6/2017 | | |

* cited by examiner

STEEL SHEET FOR CONTAINERS AND METHOD FOR PRODUCING STEEL SHEET FOR CONTAINERS

TECHNICAL FIELD OF THE INVENTION

The present invention relates to a steel sheet for a container and a method for producing the steel sheet for a container.

Priority is claimed on Japanese Patent Application No. 2018-022296 filed on Feb. 9, 2018, the content of which is incorporated herein by reference.

RELATED ART

One of the aging effects on metals during use is metal corrosion. In the related art, in order to prevent corrosion that can occur in metals, various techniques have been proposed. One of the techniques is plating a metal sheet or performing various surface treatments on the surface of a metal sheet or plating.

In the production of a metal container for the purpose of preserving beverages and foods, a plated steel sheet having a so-called barrier-type plating layer, such as a nickel-plated steel sheet, a tin-plated steel sheet, or a tin-based alloy-plated steel sheet, has been used. In a case where such a plated steel sheet is used for a metal container (a steel sheet for a container) for the purpose of preserving beverages and foods, in order to secure adhesion between the steel sheet and a coating or film and corrosion resistance, an antirust treatment is performed by chromate using hexavalent chromate or the like in many cases.

However, hexavalent chromium used for the chromate treatment is harmful to the environment. Therefore, a method for treating a steel substrate with a mixture containing a trivalent chromium compound instead of hexavalent chromium and coating the steel substrate with a metal chromium-chromium oxide coating layer, thereby producing the steel substrate coated for packaging applications has been proposed (for example, Patent Document 1). In Patent Document 1, the metal chromium-chromium oxide coating layer is not present as an individual layer on the outermost surface of the steel substrate, but is present throughout the entire coating layer in a depth direction with Cr oxide and Cr metal mixed therein.

PRIOR ART DOCUMENT

Patent Document

[Patent Document 1] Published Japanese Translation No. 2016-505708 of the PCT International Publication

DISCLOSURE OF THE INVENTION

Problems to be Solved by the Invention

In general, the external appearance of a steel sheet for a container is also important. A steel sheet for a container disclosed in Patent Document 1 was not good in gloss and external appearance. Accordingly, a steel sheet for a container which can be produced by using trivalent chromium instead of hexavalent chromium and has good external appearance, particularly good gloss and corrosion resistance, has not been known hitherto.

Therefore, the present invention has been made in view of the above problems, and an object of the present invention is to provide a novel and improved steel sheet for a container which can be produced by using trivalent chromium and has good external appearance, particularly good gloss, and corrosion resistance, and a method for producing a steel sheet for a container.

Means for Solving the Problem

The present inventors have conducted intensive studies to solve the above-described problems, and as a result, have found that by disposing a metal chromium layer on a base steel sheet, and disposing a chromium-containing layer containing particles of a trivalent chromium compound having a relatively small average particle size on the metal chromium layer, that is, by disposing the metal chromium layer and the chromium-containing layer separated into two layers on the base steel sheet, external appearance, particularly gloss, and corrosion resistance are gloss simultaneously improved. Furthermore, it has been found that by covering the outermost surface of the base steel sheet with the chromium-containing layer containing a granular trivalent chromium compound having a predetermined average particle size or containing a granular trivalent chromium compound having a predetermined average particle size and a granular metal chromium, coating adhesion is improved, so that good corrosion resistance can be obtained. As a result of further study based on such findings, the present invention described below has been reached.

In order to solve the above problems, the present invention employs the following means.

(1) A steel sheet for a container according to a first aspect of the present invention includes: a base steel sheet; a metal chromium layer; and a chromium-containing layer, in which the metal chromium layer is located on at least one surface of the base steel sheet, the chromium-containing layer is located on the metal chromium layer and contains a granular trivalent chromium compound, or contains a granular trivalent chromium compound and a granular metal chromium, the metal chromium layer and the chromium-containing layer are separately disposed in two layers on the base steel sheet, in the chromium-containing layer, an average particle size of the trivalent chromium compound and the metal chromium is 10 nm or more and 100 nm or less, and an adhesion amount of the chromium-containing layer is 1.0 mg/m$^2$ or more and 100 mg/m$^2$ or less in terms of a Cr content.

(2) In the aspect according to (1), an adhesion amount of the metal chromium layer may be 1.0 mg/m$^2$ or more and 350 mg/m$^2$ or less in terms of the Cr content.

(3) In the aspect according to (1) or (2), the chromium-containing layer may contain a sulfate compound in an amount of 0.10 mg/m$^2$ or more and 40 mg/m$^2$ or less in terms of a S content.

(4) In the aspect according to (1) or (2), the metal chromium layer and the chromium-containing layer may contain a total amount of 0.5 mg/m$^2$ or more and 80 mg/m$^2$ or less of a sulfate compound in terms of the S content.

(5) A method for producing a steel sheet for a container according to a second aspect of the present invention, includes: a chemical conversion step of treating a base steel sheet with a plurality of chemical conversion baths and forming a metal chromium layer and a chromium-containing layer containing a granular trivalent chromium compound or containing a granular trivalent chromium compound and a granular metal chromium on the metal chromium layer, the metal chromium layer and the chromium-containing layer being separated into two layers on at least one surface of the base steel sheet, in which the plurality of chemical conversion baths contain 0.10 to 250 g/L of trivalent chromium ions, 1.0 to 250 g/L of sulfate ions, 1.0 to 250 g/L of formate ions, and 1.0 to 150 g/L of borate ions, a pH of the plurality of chemical conversion baths is 3.0 or more, and an electroless time of 0.1 seconds or longer and 20 seconds or shorter is provided when the base steel sheet is moved between the plurality of chemical conversion baths.

(6) In the aspect according to (5), in the plurality of chemical conversion steps, a temperature of the plurality of chemical conversion baths may be 5° C. or higher and lower than 90° C.

(7) In the aspect according to (5) or (6), in the plurality of chemical conversion baths, the base steel sheet may be subjected to an electrolytic treatment at a current density of 0.5 A/dm$^2$ or more and 50 A/dm$^2$ or less for 0.05 seconds or longer and 10 seconds or shorter.

(8) In the aspect according to any one of (5) to (7), the plurality of chemical conversion baths may further contain 1.0 to 100 g/L of chloride ions and 1.0 to 100 g/L of potassium ions.

Effects of the Invention

As described above, according to the present invention, it is possible to provide a steel sheet for a container which can be produced by using trivalent chromium and has good external appearance, particularly good gloss, and corrosion resistance, and a method for producing a steel sheet for a container.

EMBODIMENTS OF THE INVENTION

Figure 1:
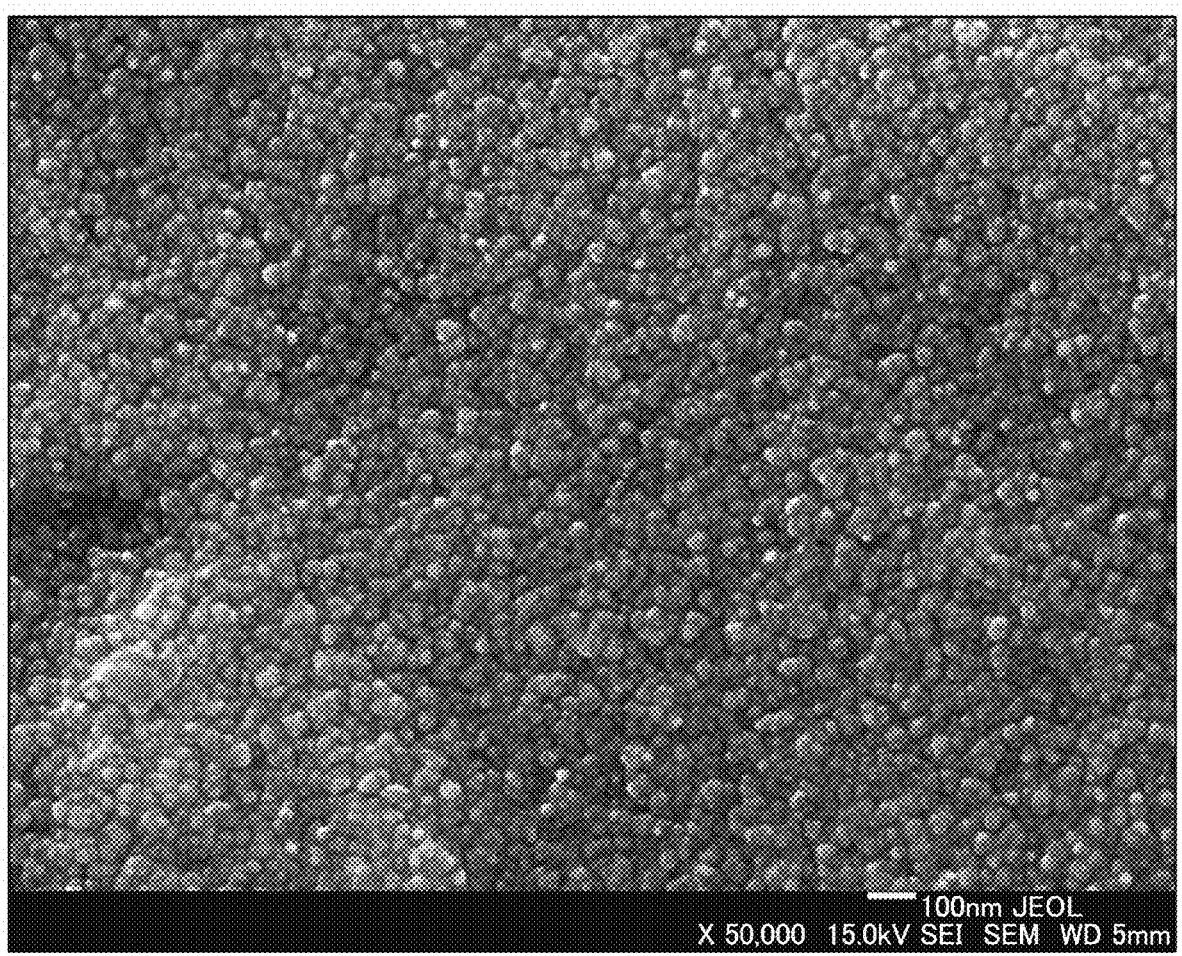
FIG. 1 is a scanning electron microscope image of a surface of a steel sheet for a container according to an embodiment of the present invention.

Hereinafter, exemplary embodiments of the present invention will be described in detail.
<Configuration of Steel Sheet Container>
First, the configuration of a steel sheet for a container according to an embodiment of the present invention will be described in detail.

The steel sheet for a container according to the present embodiment includes a base steel sheet, a metal chromium layer located on at least one surface of the steel sheet, and a chromium-containing layer located on the metal chromium layer.

(Base Steel Sheet)
The base steel sheet (hereinafter, sometimes simply referred to as a steel sheet) is the base metal of the steel sheet for a container according to the present embodiment. The steel sheet used in the present embodiment is not particularly limited, and a known steel sheet usually used as a container material can be used. A production method and a material of such a known steel sheet are not particularly limited, and a steel sheet produced from normal steel piece production steps through known steps such as hot rolling, pickling, cold rolling, annealing, and temper rolling may be adopted.

(Metal Chromium Layer)
The metal chromium layer is located on at least one surface of the steel sheet. The metal chromium layer primarily contains a metal chromium. The metal chromium layer does not contain a trivalent chromium compound. The surface of the metal chromium is oxidized when exposed to an external atmosphere to form passivation, and as a result, good chemical stability is exhibited. Therefore, the metal chromium layer exhibits good corrosion resistance together with the chromium-containing layer disposed thereon.

The adhesion amount (content) of the metal chromium layer is not particularly limited, but is preferably 1.0 mg/m$^2$ or more, and more preferably 2.0 mg/m$^2$ or more in terms of Cr content. In addition, the adhesion amount (content) of the metal chromium layer is not particularly limited, but is preferably 350 mg/m$^2$ or less, and more preferably 330 mg/m$^2$ or less in terms of Cr content. When the adhesion amount of the metal chromium layer is 1.0 mg/m$^2$ or more in terms of Cr content, sufficient corrosion resistance is secured. On the other hand, when the adhesion amount of the metal chromium layer exceeds 350 mg/m$^2$ in terms of Cr content, an effect of improving the corrosion resistance is saturated, and the unevenness of the surface of the chromium-containing layer increases and causes a reduction in glossiness. Therefore, it is preferable that the adhesion amount of the metal chromium layer is within the above range from the viewpoint of cost reduction and external appearance.

In addition, the adhesion amount of the metal chromium layer described above is in terms of the Cr content of the metal chromium (metal Cr content).

The metal chromium layer may further include a sulfate compound. The sulfate compound promotes a dehydration reaction of chromium oxide, thereby forming a strong metal chromium layer having few pinholes and improving the corrosion resistance of the metal chromium layer.

Such a sulfate compound is not particularly limited, and examples thereof include sulfate ions, hydrogen sulfide, sodium sulfide, and the like.

The amount of the sulfate compound in the metal chromium layer is preferably 0.10 mg/m$^2$ or more, and more preferably 0.20 mg/m$^2$ or more in terms of S content. The amount of the sulfate compound in the metal chromium layer is preferably 40 mg/m$^2$ or less, and more preferably 35 mg/m$^2$ or less, in terms of S content. When the amount of the sulfate compound is 0.10 mg/m$^2$ or more in terms of S content, a sufficient effect of improving corrosion resistance can be obtained. On the other hand, when the amount of the sulfate compound exceeds 40 mg/m$^2$ in terms of S content, the effect of improving the corrosion resistance due to the inclusion of the sulfate compound is saturated.

For example, the metal chromium layer may be a layer formed by laminating the granular metal chromium or other particles, or may be a continuously integrated layer (for example, a film-like layer). In a case where the metal chromium layer is a layer formed by laminating the granular metal chromium or other particles, the average particle size of the granular metal chromium is not particularly limited, but is preferably 10 nm or more, more preferably 15 nm or more, preferably 100 nm or less, and more preferably 90 nm or less. When the average particle size of the granular metal chromium in the metal chromium layer is 10 nm or more, the surface area increases, so that the adhesion between the metal chromium layer and the chromium-containing layer is improved, and as a result, the corrosion resistance is improved. On the other hand, when the average particle size of the granular metal chromium in the metal chromium layer is 100 nm or less, the metal chromium layer becomes dense and the corrosion resistance is further improved.

(Chromium-Containing Layer)

The chromium-containing layer is disposed on the metal chromium layer. The chromium-containing layer contains at least a granular trivalent chromium compound, and may further optionally contain a granular metal chromium. The average particle size of the granular trivalent chromium compound and the granular metal chromium is 10 nm or more and 100 nm or less. Like the metal chromium, the trivalent chromium compound has good chemical stability and improves the corrosion resistance of the steel sheet for a container. Furthermore, the chromium-containing layer containing the trivalent chromium compound covers the outermost surface of the steel sheet, thereby improving coating adhesion. The chromium-containing layer is formed by depositing the granular trivalent chromium compound or the trivalent chromium compound and the metal chromium having such an average particle size in the above-described range, thereby providing good corrosion resistance together with the metal chromium layer while exhibiting good gloss.

As described above, in the chromium-containing layer, the average particle size of the granular trivalent chromium compound and the metal chromium is 10 nm or more and 100 nm or less. In a case where the average particle size of the granular trivalent chromium compound and the metal chromium is less than 10 nm, the surface area of the trivalent chromium compound and the metal chromium is reduced. As a result, the coating adhesion of the steel sheet for a container cannot be obtained sufficiently. If the coating adhesion is not sufficient, corrosion factors from the outside come into direct contact with the chromium-containing layer, so that the corrosion resistance is reduced at a point where the coating is present on the chromium-containing layer. On the other hand, when the average particle size of the granular trivalent chromium compound and the metal chromium exceeds 100 nm, the granular trivalent chromium compound and the metal chromium exposed on the surface of the steel sheet for a container are too large. As a result, light incident onto the surface of the steel sheet for a container is scattered by these, and the gloss of the steel sheet for a container decreases. The average particle size of the granular trivalent chromium compound and the metal chromium may be within the above-mentioned range, but is preferably 15 nm or more, more preferably 20 nm or more, preferably 95 nm or less, and more preferably 90 nm or less.

As the trivalent chromium compound, there are chromium (III) oxide, chromium(III) hydroxide, chromium(III) sulfide, chromium(III) chloride, and the like, and any one or a combination of two or more thereof may be contained in the chromium-containing layer.

Furthermore, the chromium-containing layer may contain a compound other than the trivalent chromium compound and the metal chromium. For example, iron, iron compounds, iron oxide, nickel, nickel hydroxide, tin, tin compounds, and tin oxide may be contained. In the chromium-containing layer, the amount of such a compound other than the trivalent chromium compound and the metal chromium is preferably 20% or less, and more preferably 10% or less in terms of Cr content with respect to the total amount of the metal chromium and the trivalent chromium compound. Accordingly, the chromium-containing layer can be formed densely, and the corrosion resistance of the steel sheet for a container is further improved.

The adhesion amount (content) of the chromium-containing layer is 1.0 mg/m$^2$ or more and 100 mg/m$^2$ or less in terms of Cr content. Accordingly, the steel sheet for a container simultaneously exhibits high gloss and sufficient corrosion resistance. On the other hand, when the adhesion amount of the chromium-containing layer is less than 1 mg/m$^2$ in terms of Cr content, the corrosion resistance of the steel sheet for a container cannot be obtained sufficiently. The adhesion amount (content) of the chromium-containing layer is preferably 2.0 mg/m$^2$ or more, and more preferably 5.0 mg/m$^2$ or more in terms of Cr content. In addition, the adhesion amount (content) of the chromium-containing layer is preferably 95 mg/m$^2$ or less, and more preferably 80 mg/m$^2$ or less in terms of Cr content.

The adhesion amount of the above-described chromium-containing layer is the total amount of the metal chromium and the trivalent chromium compound in terms of Cr content (metal Cr content).

Like the metal chromium layer, the chromium-containing layer may contain a sulfate compound. Accordingly, the corrosion resistance of the metal chromium layer is further improved. Such a sulfate compound is not particularly limited, and examples thereof include a sulfate compound that can be contained in the above-described metal chromium layer.

The amount of the sulfate compound in the chromium-containing layer is preferably 0.10 mg/m$^2$ or more, and more preferably 0.20 mg/m$^2$ or more in terms of S content. The amount of the sulfate compound in the chromium-containing layer is preferably 40 mg/m$^2$ or less, and more preferably 35 mg/m$^2$ or less in terms of S content. When the amount of the sulfate compound is 0.10 mg/m$^2$ or more in terms of S content, a sufficient effect of improving corrosion resistance can be obtained. On the other hand, when the amount of the sulfate compound exceeds 40 mg/m$^2$ in terms of S content, the effect of improving the corrosion resistance due to the inclusion of the sulfate compound is saturated.

The total amount of the sulfate compound in the metal chromium layer and the chromium-containing layer is preferably 0.5 mg/m$^2$ or more, and more preferably 1.0 mg/m$^2$ or more in terms of S content. In addition, the total amount of the sulfate compound in the metal chromium layer and the chromium-containing layer is preferably 80 mg/m$^2$ or less, and more preferably 60 mg/m$^2$ or less in terms of S content. Accordingly, the effect of improving corrosion resistance by including the sulfate compound can be significantly obtained.

The steel sheet for a container according to the present embodiment described above includes the metal chromium layer and the chromium-containing layer containing the granular trivalent chromium compound having a predetermined average particle size and an adhesion amount, or the trivalent chromium compound and the granular metal chromium, that is, includes the metal chromium layer and the chromium-containing layer separated into two layers, and thus has good corrosion resistance. Furthermore, since the predetermined amount of the granular trivalent chromium compound and the granular metal chromium in the chromium-containing layer exposed on the surface of the steel sheet for a container have an average particle size in the above-mentioned range, the gloss of the steel sheet for a container is increased. Accordingly, the external appearance of the steel sheet for a container becomes good. Furthermore, since the chromium-containing layer covers the outermost surface of the steel sheet, coating adhesion is improved, so that good corrosion resistance can be obtained. In addition, it is possible to produce the steel sheet for a container according to the present embodiment as described above using trivalent chromium without using hexavalent chromium as a raw material, as will be described later.

In a case where the particles of the trivalent chromium compound and the metal chromium are mixed throughout the entire coating layer on the steel sheet in the depth direction, a good external appearance cannot be obtained. Although the reason for this is not clear, it is presumed that the trivalent chromium compound generally tends to exhibit green, and the color of the trivalent chromium compound is reflected by diffuse reflection in the entire layer in the depth direction.

Another Embodiment

Next, another embodiment of the present invention will be described. Hereinafter, differences between the present embodiment and the above-described embodiment will be mainly described, and redundant descriptions of the same matters will be omitted.

First, in the above-described embodiment, the metal chromium layer is formed only on one surface of the steel sheet, and the chromium-containing layer is formed on the metal chromium layer. However, the present invention is not limited thereto. For example, the steel sheet for a container according to the present invention may have a metal chromium layer and a chromium-containing layer on the metal chromium layer on both sides of the steel sheet. Accordingly, a steel sheet for a container having good external appearance, particularly gloss, and corrosion resistance on both sides of the steel sheet is achieved.

Furthermore, the steel sheet for a container of the present invention may have a metal chromium layer formed on one surface of the steel sheet and a chromium-containing layer formed on the metal chromium layer, and have layers having other functions and components on the other surface.

<Analysis Method of Steel Sheet for Container>

Hereinafter, an analysis method of each component of the steel sheet for a container according to the present embodiment will be described.

(Layer Configuration)

First, the boundary between the metal chromium layer and the chromium-containing layer can be determined by acquiring a binding energy spectrum in the depth direction of the steel sheet for a container using X-ray photoelectron spectroscopy (XPS) and using the peak of the obtained binding energy spectrum. That is, the peaks of the binding energies of Cr and the trivalent chromium compound in the spectrum in the depth direction of the steel sheet for a container are determined. A layer in which only the peak of Cr is recognized is the metal chromium layer, and a layer in which the peak of the trivalent chromium compound or the trivalent chromium compound and Cr is recognized can be defined as the chromium-containing layer. A case where a spectrum in which only the peak of Cr is recognized and a spectrum in which the peak of the trivalent chromium compound or the trivalent chromium compound and Cr peak is recognized are recognized refers to a state where the metal chromium layer and the chromium-containing layer are separated into two layers. In order to determine the peak of the binding energy, for example, it can be determined that the peak is recognized at the position of the binding energy at a point at which the sign of the curvature of the peak changes.

The amounts of Cr and S in the metal chromium layer and the chromium-containing layer forming the steel sheet for a container can be measured, for example, by a quantitative analysis method of X-ray photoelectron spectroscopy (XPS).

(Average Particle Size)

For example, the average particle size of the granular metal chromium and the trivalent chromium compound that can be present in the chromium-containing layer is obtained by obtaining an image of the surface of the chromium-containing layer by a scanning electron microscope (SEM), specifying a plurality of, for example, 100 particles of the granular metal chromium and the trivalent chromium compound present in the image of the surface, measuring the particle sizes thereof, and averaging the particle sizes. The average particle size used here is the average particle size of particles having a particle size of 1 nm or more in the image of the surface obtained at a magnification of 50,000-×.

In order to measure the average particle size of the granular metal chromium in the metal chromium layer exposed on the surface, for example, the average particle size thereof can be measured by obtaining an image of the surface of the metal chromium layer by a scanning electron microscope (SEM), specifying a plurality of, for example, 100 particles of the granular metal chromium present in the image of the surface, measuring the particle sizes thereof, and averaging the particle sizes thereof. The average particle size used here is the average particle size of particles having a particle size of 1 nm or more in the image of the surface obtained at a magnification of 50,000-×.

However, in Comparative Examples a6 and a8 of Table 1 in which the metal chromium layer was exposed on the surface, the average particle size was too small to be observed and could not be measured.

<Method for Producing Steel Sheet for Container>

Next, a method for producing a steel sheet for a container according to the present embodiment will be described in detail. The method for producing a steel sheet for a container according to the present embodiment includes a chemical conversion step of treating a steel sheet with a plurality of chemical conversion baths and forming a metal chromium layer and a chromium-containing layer containing a granular trivalent chromium compound or containing a granular trivalent chromium compound and a granular metal chromium on the metal chromium layer, the metal chromium layer and the chromium-containing layer being separated into two layers on at least one surface of the steel sheet. The plurality of chemical conversion baths contain 0.10 to 250 g/L of trivalent chromium ions, 1.0 to 250 g/L of sulfate ions, 1.0 to 250 g/L of formate ions, and 1.0 to 150 g/L of borate ions, and the pH of the plurality of chemical conversion baths is 3.0 or more. An electroless time of 0.1 seconds or longer and 20 seconds or shorter is provided when the steel sheet is moved between the plurality of chemical conversion baths.

In the method for producing a steel sheet for a container according to the present embodiment, first, a known pre-treatment is performed on the steel sheet as necessary.

Next, the metal chromium layer and the chromium-containing layer are simultaneously formed by treatments performed in the plurality of chemical conversion baths. The metal chromium layer and the chromium-containing layer are formed, for example, by an electrolytic treatment (for example, cathodic electrolytic treatment) using the plurality of chemical conversion baths. In an actual treatment of the steel sheet for a container according to the present embodiment, since the plurality of chemical conversion baths are used, there is an electroless time between the chemical conversion baths. By providing this electroless time, the metal chromium layer and the chromium-containing layer separated into two layers can be formed. In addition, the electroless time is a time during which the electrolytic treatment that occurs when the steel sheet for a container is moved between the plurality of chemical conversion baths is not performed in the chemical conversion step.

As described above, the plurality of chemical conversion baths (chemical conversion liquids) contain 0.10 to 250 g/L of trivalent chromium ions, 1.0 to 250 g/L of sulfate ions, and 1.0 to 250 g/L of formate ions, and 1.0 to 150 g/L of borate ions.

The trivalent chromium ions are a raw material for the metal chromium and chromium compounds in the metal chromium layer and the chromium-containing layer. When the addition amount of the trivalent chromium ions is less than 0.10 g/L, the precipitation efficiency of the metal chromium and a trivalent chromium compound on the steel sheet decreases. On the other hand, when the addition amount of the trivalent chromium ions exceeds 250 g/L, the increase in the adhesion efficiency of the metal chromium and the trivalent chromium compound is saturated. The plurality of chemical conversion baths preferably contain 5 to 220 g/L of trivalent chromium ions.

The sulfate ions improve the precipitation efficiency of the metal chromium and the trivalent chromium compounds on the steel sheet. In addition, the sulfate ions precipitate as a sulfate compound in the metal chromium layer and the chromium-containing layer, and improve the corrosion resistance of the steel sheet for a container. When the addition amount of the sulfate ions is less than 1.0 g/L, the precipitation efficiency of the metal chromium and the trivalent chromium compound on the steel sheet decreases. On the other hand, when the addition amount of the sulfate ions exceeds 250 g/L, the increase in the adhesion efficiency of the metal chromium and the trivalent chromium compound is saturated. The plurality of chemical conversion baths preferably contain 5 to 220 g/L of sulfate ions.

The formate ions exhibit a pH buffering action, stabilize the pH of the plurality of chemical conversion baths, and thus the composition, and improve the precipitation efficiency of the metal chromium and the trivalent chromium compounds on the steel sheet. When the addition amount of the formate ions is less than 1.0 g/L, the precipitation efficiency of the metal chromium and the trivalent chromium compounds on the steel sheet decreases. On the other hand, when the addition amount of the formate ions exceeds 250 g/L, the increase in the adhesion efficiency of the metal chromium and the trivalent chromium compound is saturated. The plurality of chemical conversion baths preferably contain 5 to 220 g/L of formate ions.

The borate ions have a complexing action and stabilize the trivalent chromium ions in the plurality of chemical conversion baths. In addition, the borate ions prevent segregation of the particles of the metal chromium and the trivalent chromium compound, and cause the particle size of the particles of the metal chromium and the trivalent chromium compound to be relatively small. Furthermore, the borate ions improve the adhesion efficiency of the metal chromium and the trivalent chromium compound to the steel sheet. When the addition amount of the borate ions is less than 1.0 g/L, the precipitation efficiency of the metal chromium and the trivalent chromium compound on the steel sheet decreases. On the other hand, when the addition amount of the borate ions exceeds 150 g/L, the adhesion efficiency and segregation prevention effect of the metal chromium and the trivalent chromium compound are saturated. The plurality of chemical conversion baths preferably contain 5 to 120 g/L of borate ions.

Furthermore, the plurality of chemical conversion baths may contain 1.0 to 100 g/L of chloride ions. The chloride ions are added to control the pH, and contribute to an improvement in conductivity in the plurality of chemical conversion baths. Accordingly, the adhesion efficiency of the metal chromium layer and the chromium-containing layer is improved. When the amount of the chloride ions in the plurality of chemical conversion baths is 1.0 g/L or more, the above-mentioned effects can be sufficiently obtained. When the amount of the chloride ions in the plurality of chemical conversion baths exceeds 100 g/L, the effect of improving the adhesion efficiency is saturated. The plurality of chemical conversion baths preferably contain 2.0 to 95 g/L of chloride ions.

Furthermore, the plurality of chemical conversion baths may contain 1.0 to 100 g/L of potassium ions. The potassium ions are added to control the pH and contribute to an improvement in the external appearance of the obtained steel sheet for a container. When the amount of the potassium ions in the plurality of chemical conversion baths is 1.0 g/L or more, the above-mentioned effects can be sufficiently obtained. When the amount of the potassium ions in the plurality of chemical conversion baths exceeds 100 g/L, the effect of improving the adhesion efficiency is saturated. The plurality of chemical conversion baths preferably contain 2.0 to 95 g/L of potassium ions.

Furthermore, as a solvent for the plurality of chemical conversion baths, for example, deionized water, distilled water, or the like can be used. A preferable electric conductivity of the solvent is 10 µS/cm or less, preferably 5 µS/cm or less, more preferably 3 µS/cm or less. However, the solvent of the plurality of chemical conversion baths is not limited thereto, and can be appropriately selected according to the material to be dissolved, the forming method, the conditions for forming the metal chromium layer and the chromium-containing layer, and the like. However, it is preferable to use deionized water and distilled water from the viewpoints of industrial productivity, cost, and environment based on stable adhesion amount stability of each element.

The pH of the plurality of chemical conversion baths is 3.0 or more. Since the pH of the plurality of chemical conversion baths is relatively high as described above, the adhesion efficiency of the metal chromium layer and the chromium-containing layer is improved, and in each of the metal chromium layer and the chromium-containing layer, the particles of the metal chromium and the trivalent chromium compound are uniformized in terms of particle size. As a result, the external appearance of the obtained steel sheet for a container becomes good. On the other hand, when the pH of the plurality of chemical conversion baths is less than 3.0, the external appearance of the obtained steel sheet for a container does not become good. In particular, the gloss of the steel sheet for a container is reduced. It is considered that this is because the trivalent chromium compound and the metal chromium are mixed throughout the entire coating layer and precipitated in the chemical conversion step.

The pH of the plurality of chemical conversion baths may be 3.0 or more, but is preferably 3.1 or more, and more preferably 3.3 or more. Although the upper limit of the pH of the plurality of chemical conversion baths is not particularly limited, since chromium precipitates are generated in the bath due to the increase in pH, the pH of the plurality of chemical conversion baths is preferably 7.0 or less, and more preferably 6.5 or less.

The temperature of the plurality of chemical conversion baths is preferably, for example, 5° C. or higher and lower than 90° C. When the temperature of the plurality of chemical conversion baths is 5° C. or higher, the formation efficiency of the metal chromium layer and the chromium-containing layer is sufficient, and the metal chromium layer and the chromium-containing layer can be formed economically. When the temperature of the plurality of chemical conversion baths is lower than 90° C., the structure of a formed film can be made uniform, and the generation of defects, cracks, microcracks, and the like can be suppressed, so that a dense film can be formed. As a result, the generation of corrosion origin in the metal chromium layer and the chromium-containing layer can be suppressed.

In addition, the temperature of the plurality of chemical conversion baths is preferably higher than the surface temperature of the steel sheet in order to increase the reactivity of the plurality of chemical conversion baths at the interface and to improve the adhesion efficiency of the metal chromium layer and the chromium-containing layer.

In a case where the metal chromium layer and the chromium-containing layer are formed by the electrolytic treatment (cathode electrolytic treatment) using the plurality of chemical conversion baths, the current density during the electrolytic treatment is preferably 0.5 A/dm$^2$ or more and 50 A/dm$^2$ or less. In a case where the current density is less than 0.5 A/dm$^2$, there are cases where the adhesion amount of the metal chromium layer and the chromium-containing layer decreases depending on the composition of the plurality of chemical conversion baths and the electrolytic treatment time increases, which is not preferable. In a case where the current density exceeds 50 A/dm$^2$, there is a possibility that the adhesion amount of the metal chromium layer and the chromium-containing layer may become excessive depending on the composition of the plurality of chemical conversion baths, and the metal chromium layer and the chromium-containing layer which are insufficiently adhered in the formed metal chromium layer and the chromium-containing layer may be washed away (peeled off) in a washing step such as washing with water after the electrolytic treatment, which is not preferable.

It is necessary to provide an electroless time of 0.1 seconds or longer and 20 seconds or shorter during the electrolytic treatment. By providing the electroless time, it is possible to form the metal chromium layer and the chromium-containing layer separated into two layers. When the electroless time is shorter than 0.1 seconds, the effect of the separation into two layers is insufficient, and when the electroless time exceeds 20 seconds, there are cases where the electrolytic treatment time increases.

The time for which the electrolytic treatment is performed (electrolytic treatment time) is preferably 0.05 seconds or longer and 10 seconds or shorter. In a case where the electrolytic treatment time is shorter than 0.05 seconds, there are cases where the adhesion amount of the metal chromium layer and the chromium-containing layer decreases depending on the composition of the plurality of chemical conversion baths, and desired performance cannot be obtained. On the other hand, in a case where the electrolytic treatment time exceeds 10 seconds, there is a possibility that the adhesion amount of the metal chromium layer and the chromium-containing layer may become excessive depending on the composition of the plurality of chemical conversion baths, and the metal chromium layer and the chromium-containing layer which are insufficiently adhered in the formed metal chromium layer and the chromium-containing layer may be washed away (peeled off) in a washing step such as washing with water after the electrolytic treatment.

By the above-described chemical conversion step, the metal chromium layer and the chromium-containing layer separated into two layers are simultaneously formed on the steel sheet.

The total precipitation amount of the granular metal chromium and the trivalent chromium compound can be controlled by the current density and the treatment time. In addition, the ratio between the adhesion amount of the metal chromium layer and the adhesion amount of the chromium-containing layer can be controlled by the current density. That is, in the electrolytic treatment, as the current density increases, the ratio of the amount of the metal chromium precipitated increases, and the ratio of the metal chromium layer increases. By controlling the current density in the same manner, it is possible to simultaneously control the ratio between the amount of the metal chromium and the amount of the trivalent chromium compound in the chromium-containing layer. In addition, by changing the treatment time while controlling the current density, the total precipitation amount of the metal chromium and the trivalent chromium compound is controlled.

Furthermore, the average particle size of the granular metal chromium in the chromium-containing layer can be controlled by the amount of sulfate ions contained in the plurality of chemical conversion baths. That is, by increasing the amount of sulfate ions in the plurality of chemical conversion baths, it is possible to increase the precipitation efficiency of fine chromium at the initial stage of chromium adhesion and to reduce the particle size of the granular metal chromium. The average particle size of the granular trivalent chromium compound in the chromium-containing layer can be controlled by controlling the temperatures of the plurality of chemical conversion baths. That is, by lowering the bath temperature of the plurality of chemical conversion baths, the precipitation efficiency is reduced, the local current is more likely to flow, and as a result, the particle size of the precipitated trivalent chromium compound increases.

Thereafter, as necessary, a known post-treatment is performed on the steel sheet on which the metal chromium layer and the chromium-containing layer are formed. By performing the treatment in such a flow, the steel sheet for a container according to the present embodiment is produced.

EXAMPLES

Hereinafter, the steel sheet for a container and the method for producing a steel sheet for a container according to the embodiment of the present invention will be specifically described with reference to test examples. The test examples described below are merely examples of the steel sheet for a container and the method for producing a steel sheet for a container according to the embodiment of the present invention, and the steel sheet for a container and the method for producing a steel sheet for a container according to the embodiment of the present invention are not limited to the following example.

Example 1

First, a steel sheet (base steel sheet) used for a test was prepared. As the steel sheet, a steel sheet used for a general container was used.

Next, a metal chromium layer and a chromium-containing layer were simultaneously formed on the surface of the steel sheet by the following method. Accordingly, a steel sheet for a container was obtained.

The metal chromium layer and the chromium-containing layer were formed by performing an energizing treatment in a state where the steel sheet was immersed in a chemical conversion bath. As the chemical conversion bath, a bath containing 50 g/L of trivalent chromium ions, 50 g/L of sulfate ions, 50 g/L of formate ions, and 40 g/L of borate ions was used in principle. The pH of the chemical conversion bath was set to 3.5 for Invention Examples A1 to A6 and Comparative Examples a1 to a10 in Table 1, 3.5 for Invention Examples B1 to B8 in Table 2, and 3.9 for Invention Examples C1 to C3 in Table 3. Invention Examples A1 to A6 and Comparative Examples a1 to a8 in Table 1 are examples in which an electroless time of 0.15 seconds was provided, and Comparative Examples a9 and a10 are examples in which no electroless time was provided. The electroless time of Invention Examples B1 to B8 in Table 2 was set to 1.5 seconds, and the electroless time of Invention Examples C1 to C3 in Table 3 was set to 1.7 seconds. In addition, the elements in the chemical conversion bath and the conditions of the electrolytic treatment were appropriately changed in accordance with the desired adhesion amounts of the metal chromium layer and the chromium-containing layer.

Tables 1 to 3 show the configuration of the steel sheet for a container obtained in each example. In addition, the adhesion amount (content) of each element in each layer was measured by X-ray photoelectron spectroscopy (XPS). The adhesion amount of Cr (Cr content) in each layer was subjected to peak separation in a depth direction analysis at a pitch of about 1.5 nm by the X-ray photoelectron spectroscopy (XPS). The peak separation was performed by data processing software attached to the X-ray photoelectron spectroscopy (XPS). Specifically, Quantera SXM (manufactured by ULVAC-PHI, Inc.) was used for the X-ray photoelectron spectroscopy (XPS), and MultiPak was used for the data processing software. The adhesion amount of S in each layer (S content) was identified by the integrated value of signal intensities from the surface layer to each layer obtained by a GDS depth direction analysis regarding the depth of each layer obtained by the X-ray photoelectron spectroscopy (XPS). The calibration curve of the integrated value of the signal intensities and the adhesion amount (content) of S was prepared in advance using a general standard sample. In addition, the adhesion amount (content) of each element in each layer of Table 4 and Table 6 was measured by the same measuring method.

In addition, regarding the boundary between the metal chromium layer and the chromium-containing layer, a cross-sectional sample of each steel sheet for a container was prepared, the binding energy spectrum of Cr and the trivalent chromium compound in the depth direction of the steel sheet for a container was acquired using the X-ray photoelectron spectroscopy (XPS). The layer where only the peak of Cr was recognized was defined as the metal chromium layer, and the layer where the peak of the trivalent chromium compound or the trivalent chromium compound and Cr was recognized was defined as the chromium-containing layer. Regarding the average particle size of the granular trivalent chromium compound and the metal chromium in the chromium-containing layer, surface observation was performed with a scanning electron microscope (SEM). The magnification of the scanning electron microscope was set to 50,000-×, 100 particles each having a particle size of 1 nm or more were specified for the granular trivalent chromium compound and the metal chromium, and the average particle size was measured and calculated therefrom. In addition, "–" for a compound in the tables indicates that the compound is not contained. In Table 1, "–" for an average particle size of Comparative Examples a6 and a8 was shown as "–" because the average particle size was too small to be observed and could not be measured. In Table 1, "–" for a metal Cr content in the metal chromium layer of Comparative Examples a9 and a10 indicates that no metal chromium was contained and the metal chromium layer could not be confirmed.

For the obtained steel sheet for a container, corrosion resistance and glossiness (external appearance) were evaluated as described below.

(Corrosion Resistance)

A circular test piece of φ35 mm was cut out from the obtained steel sheet for a container, and collected. The obtained test piece was placed on the mouth of a heat-resistant bottle containing 3% acetic acid and fixed, and then heat-treated at 121° C. for 60 minutes. The corrosion resistance was evaluated by the ratio of the corroded area to the area of the mouth of the heat-resistant bottle where a corrosion resistance test solution was in contact with the test piece. More specifically, grades of the following 1 to 10 points were given according to the ratio of the corroded area to the area where the test piece was in contact with the test solution. In this corrosion resistance test, steel sheets having a grade of 5 points or more can be used as steel sheets for a container.

1 point: 90% or more
2 points: 80% or more and less than 90%
3 points: 70% or more and less than 80%
4 points: 60% or more and less than 70%
5 points: 50% or more and less than 60%
6 points: 40% or more and less than 50%
7 points: 30% or more and less than 40%
8 points: 20% or more and less than 30%
9 points: 10% or more and less than 20%
10 points: less than 10%

(Glossiness)

Regarding the obtained steel sheet for a container, a measurement angle of a gloss meter was set to 20°, and glossiness measurement was performed to obtain the glossiness. The glossiness can be measured by a method according to JIS Z 8741. The external appearance of a product as the steel sheet for a container was determined to be good when the glossiness was 15 or more and poor when the glossiness was less than 15.

TABLE 1

| | | Steel sheet for container | | | | | |
| | | Metal chromium layer | Chromium-containing layer | | | Evaluation | |
| | | Metal Cr content (mg/m$^2$) | Average particle size (nm) | Trivalent chromium compound Metal Cr content (mg/m$^2$) | Metal chromium Metal Cr content (mg/m$^2$) | Corrosion resistance | Glossiness |
| | Symbol | | | | | | |
| Invention Example | A1 | 235 | 12 | 23 | — | 8 | 35 |
| | A2 | 292 | 98 | 12 | — | 9 | 31 |

TABLE 1-continued

| | | Steel sheet for container | | | | | |
|---|---|---|---|---|---|---|---|
| | | Chromium-containing layer | | | | Evaluation | |
| | Symbol | Metal chromium layer Metal Cr content (mg/m$^2$) | Average particle size (nm) | Trivalent chromium compound Metal Cr content (mg/m$^2$) | Metal chromium Metal Cr content (mg/m$^2$) | Corrosion resistance | Glossiness |
| | A3 | 130 | 23 | 2 | — | 6 | 24 |
| | A4 | 243 | 45 | 97 | — | 7 | 26 |
| | A5 | 124 | 12 | 23 | 24 | 6 | 21 |
| | A6 | 134 | 24 | 10 | 12 | 8 | 20 |
| Comparative Example | a1 | 4 | <u>1</u> | 27 | — | 4 | 18 |
| | a2 | 337 | <u>107</u> | 82 | — | 9 | 3.2 |
| | a3 | 12 | 18 | <u>0.1</u> | — | 1 | 17 |
| | a4 | 317 | 23 | <u>109</u> | — | 10 | 2.1 |
| | a5 | 5 | 10 | <u>0.1</u> | <u>0.1</u> | 4 | 18 |
| | a6 | 78 | — | — | 0.4 | 9 | 21 |
| | a7 | 12 | <u>0.2</u> | 0.4 | <u>0.1</u> | 1 | 20 |
| | a8 | 38 | — | — | 123 | 10 | 6.5 |
| | a9 | — | 13 | 46 | 34 | 2 | 3.2 |
| | a10 | — | 24 | 21 | 15 | 1 | 2.4 |

(The underlined indicate outside of the range of the present invention example.)

TABLE 2

| | | Steel sheet for container | | | | | | |
|---|---|---|---|---|---|---|---|---|
| | | Chromium-containing layer | | | | | Evaluation | |
| | Symbol | Metal chromium layer Metal Cr content (mg/m$^2$) | Average particle size (nm) | Trivalent chromium compound Metal Cr content (mg/m$^2$) | Metal chromium Metal Cr content (mg/m$^2$) | Sulfate compound S content (mg/m$^2$) | Corrosion resistance | Glossiness |
| Invention Example | B1 | 75 | 14 | 11 | 63 | 0.2 | 8 | 23 |
| | B2 | 237 | 34 | 47 | 36 | 38 | 9 | 43 |
| | B3 | 283 | 24 | 22 | 25 | 10 | 10 | 35 |
| | B4 | 84 | 36 | 46 | 23 | 22 | 9 | 32 |
| | B5 | 132 | 41 | 24 | 40 | 0.3 | 9 | 39 |
| | B6 | 284 | 28 | 10 | 4 | 37 | 10 | 23 |
| | B7 | 52 | 43 | 6 | 84 | 1 | 10 | 25 |
| | B8 | 158 | 96 | 80 | 18 | 24 | 10 | 31 |

TABLE 3

| | | Steel sheet for container | | | | | | | |
|---|---|---|---|---|---|---|---|---|---|
| | | Chromium-containing layer | | | | | | Evaluation | |
| | Symbol | Metal chromium layer Metal Cr content (mg/m$^2$) | Average particle size (nm) | Trivalent chromium compound Metal Cr content (mg/m$^2$) | Metal chromium Metal Cr content (mg/m$^2$) | Sulfate compound S content (mg/m$^2$) | Total sulfate compound in layers S content (mg/m$^2$) | Corrosion resistance | Glossiness |
| Invention Example | C1 | 240 | 34 | 86 | 12 | 0.1 | 0.22 | 8 | 19 |
| | C2 | 143 | 50 | 40 | 52 | 23 | 38 | 9 | 21 |
| | C3 | 214 | 92 | 31 | 36 | 12 | 24 | 8 | 23 |

As is clear from Tables 1 to 3, the steel sheet for a container of the present invention had good corrosion resistance, high glossiness, and good external appearance. Contrary to this, the steel sheets for a container according to Comparative Examples a1 to a10 did not have sufficient corrosion resistance or had low glossiness and poor external appearance. The steel sheets for a container according to Comparative Examples a9 and a10 are comparative examples in which no electroless time was provided. In the steel sheets for a container according to Comparative Examples a9 and a10, a metal chromium layer could not be confirmed. That is, in the steel sheets for a container according to Comparative Examples a9 and a10, the metal chromium layer and the chromium-containing layer were not separated into two layers on the steel sheet for a container. As a result, the glossiness was low and sufficient corrosion resistance could not be provided.

In Comparative Examples a6 and a8 in which no trivalent chromium compound was contained in Table 1, corrosion resistance showed high values. However, in actual use, there is a possibility that the corrosion resistance may deteriorate due to the surrounding environment and these high values could not be shown.

FIG. 1 shows an observed image of the surface of the steel sheet for a container according to Invention Example A6 by a scanning electron microscope (SEM). As the scanning electron microscope, JSM-7001F (manufactured by JEOL Ltd.) was used. The magnification of the scanning electron microscope was set to 50,000-×, and the visual field size was set to 2×1.5 μm. According to FIG. 1, it was observed that a dense chromium-containing layer was formed on the surface of the steel sheet for a container by the particles of the granular metal chromium and the granular trivalent chromium compound.

Figure 2:
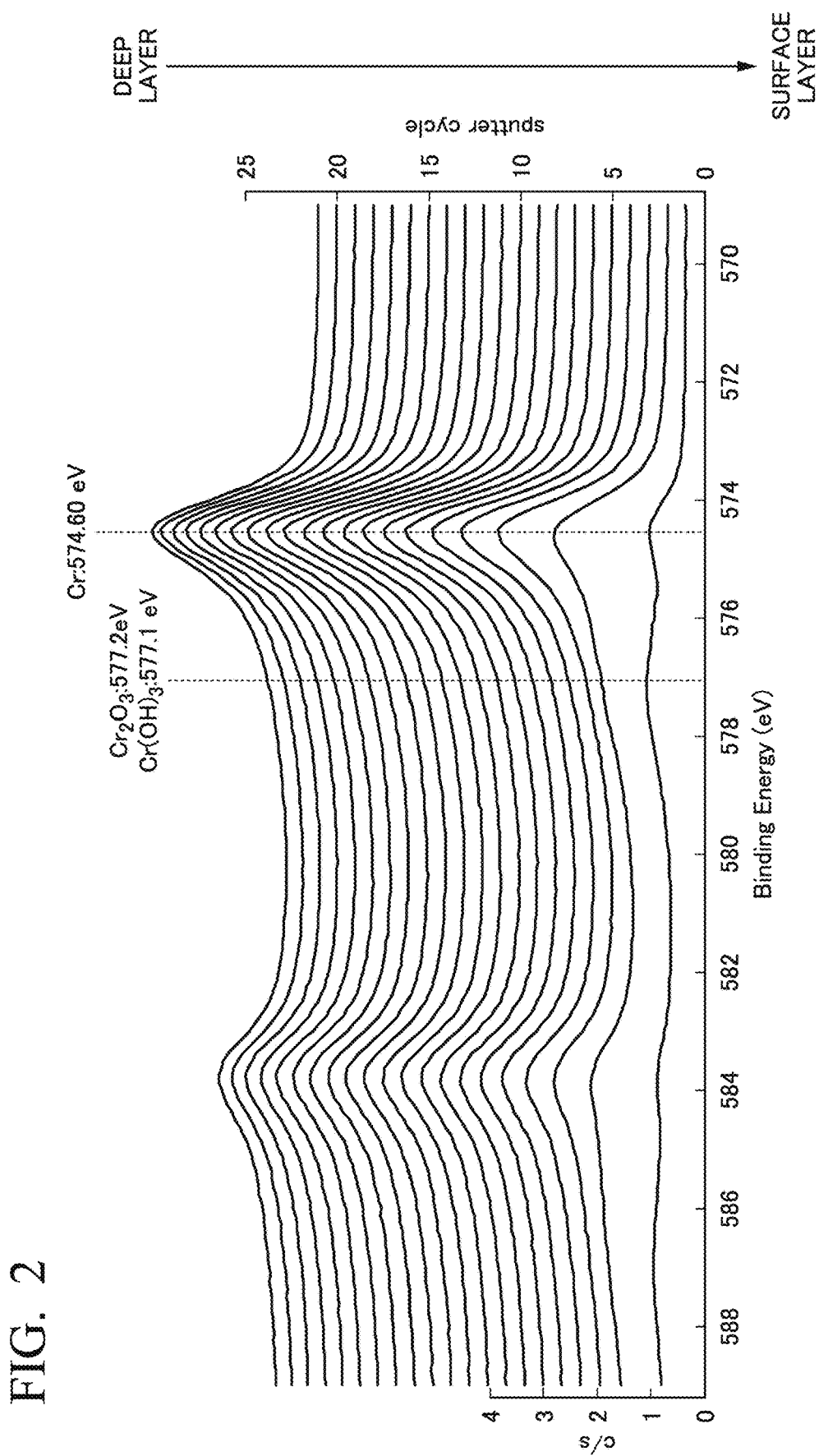
FIG. 2 is a spectrum showing a result of a depth direction analysis of a steel sheet for a container measured by X-ray photoelectron spectroscopy (XPS) in the embodiment.

FIG. 2 is a spectrum showing a result of a depth direction analysis of a cross section of the steel sheet for a container measured by X-ray photoelectron spectroscopy (XPS) in the steel sheet for a container according to Invention Example A1. Quantera SXM (manufactured by ULVAC-PHI, Inc.) was used for the X-ray photoelectron spectroscopy (XPS), and MultiPak was used for data processing software. The vertical axis on the right side of FIG. 2 is sputter cycle, which indicates the number of measurements at about every 1.5 nm from the surface layer. The vertical axis on the left side of FIG. 2 is c/s, which indicates the number of signals detected in one second. In FIG. 2, the lower side is the surface layer, and the upper side is the deep layer (the steel sheet for a container side). In Invention Example A1 shown in FIG. 2, the depth from the surface layer to 30 nm was measured. In the lower two spectra in FIG. 2, a peak of Cr at 574.60 eV, a peak of chromium(III) oxide at 577.2 eV, and a peak of chromium(III) hydroxide at 577.1 eV are recognized. That is, the range of the depth of the two lower spectra is the chromium-containing layer. On the other hand, in the spectra other than these two spectra (all the upper spectra from the third spectrum from the bottom in FIG. 2), a peak of only Cr is recognized. That is, the range of the depth of these spectra is the metal chromium layer. Therefore, it can be seen that ion the steel sheet for a container according to the embodiment, the metal chromium layer and the chromium-containing layer separated into two layers are disposed on the steel sheet.

Example 2

First, a steel sheet (base steel sheet) used for a test was prepared. As the steel sheet, a steel sheet used for a general container was used.

Next, a metal chromium layer and a chromium-containing layer were simultaneously formed on the surface of the steel sheet by the following method. Accordingly, a steel sheet for a container was obtained.

The metal chromium layer and the chromium-containing layer were formed by performing an energizing treatment (electrolytic treatment) in a state where the steel sheet was immersed in a chemical conversion bath having the composition shown in Table 4. The electroless time of this example was set to 2.2 seconds. At this time, in principle, the temperature of the chemical conversion bath was set to 60° C., the current density was set to 10 A/dm$^2$, the energizing time was set to 1 second, and the conditions of the electrolytic treatment were appropriately changed in accordance with the adhesion amounts of the desired metal chromium layer and the chromium-containing layer.

Table 4 shows the configuration of the steel sheet for a container obtained in each example. In addition, the value of each component in Table 4 is a value obtained by performing the measurement according to the method described above.

Furthermore, for the obtained steel sheet for a container, corrosion resistance and glossiness (external appearance) were evaluated as described above. The results are shown in Table 4. In addition, "−" for a compound in Table 4 indicates that the compound is not contained.

TABLE 4

| | | Chemical conversion step Chemical conversion bath | | | | | Metal chromium | Chromium-containing layer | | | | |
|---|---|---|---|---|---|---|---|---|---|---|---|---|
| | | Trivalent chromium ions (g/L) | Sulfate ions (g/L) | Formate ions (g/L) | Borate ions (g/L) | pH | layer Metal Cr content (mg/m$^2$) | Average particle size (nm) | Trivalent chromium compound Metal Cr content (mg/m$^2$) | Metal chromium Metal Cr content (mg/m$^2$) | Sulfate compound S content (mg/m$^2$) | Evaluation |
| | Symbol | | | | | | | | | | | Corrosion resistance / Glossiness |
| Invention Example | D1 | 0.13 | 133 | 203 | 24 | 5.3 | 49 | 78 | 72 | 23 | 3 | 8 / 21 |
| | D2 | 245 | 40 | 108 | 114 | 5.4 | 280 | 18 | 51 | 10 | 1 | 7 / 19 |
| | D3 | 82 | 1.3 | 172 | 130 | 4.2 | 161 | 36 | 14 | 79 | 2 | 9 / 25 |
| | D4 | 70 | 246 | 21 | 105 | 3.2 | 249 | 34 | 15 | 28 | 18 | 8 / 34 |
| | D5 | 11 | 187 | 1.2 | 43 | 6.8 | 32 | 43 | 73 | 19 | 16 | 5 / 26 |
| | D6 | 87 | 164 | 248 | 57 | 5.2 | 50 | 67 | 22 | 12 | 33 | 8 / 45 |
| | D7 | 231 | 27 | 48 | 1.2 | 4.2 | 163 | 14 | 10 | 15 | 23 | 9 / 33 |
| | D8 | 241 | 43 | 23 | 148 | 5.3 | 42 | 61 | 23 | 17 | 12 | 8 / 23 |

TABLE 4-continued

| | | Chemical conversion step Chemical conversion bath | | | | | Metal chromium | | Chromium-containing layer | | | Evaluation | |
|---|---|---|---|---|---|---|---|---|---|---|---|---|---|
| | | Trivalent chromium | Sulfate | Formate | Borate | | layer Metal Cr | Average particle | Trivalent chromium compound Metal Cr | Metal chromium Metal Cr | Sulfate compound | | |
| | Symbol | ions (g/L) | ions (g/L) | ions (g/L) | ions (g/L) | pH | content (mg/m²) | size (nm) | content (mg/m²) | content (mg/m²) | S content (mg/m²) | Corrosion resistance | Glossiness |
| | D9 | 169 | 50 | 230 | 28 | 3.1 | 32 | 42 | 63 | 14 | 23 | 6 | 27 |
| | D10 | 81 | 88 | 109 | 122 | 7 | 32 | 67 | 21 | 46 | 6 | 7 | 36 |
| | D11 | 204 | 242 | 33 | 114 | 4.9 | 54 | 35 | 20 | 74 | — | 8 | 38 |
| | D12 | 143 | 81 | 238 | 110 | 3.5 | 337 | 75 | 73 | 16 | 39 | 8 | 35 |
| Comparative Example | d1 | 0.08 | 92 | 119 | 95 | 5.4 | 0.5 | 12 | 0.2 | 0.6 | 28 | 1 | 34 |
| | d2 | 223 | 0.7 | 156 | 66 | 5.8 | 0.5 | 85 | 0.6 | 0.3 | 15 | 1 | 33 |
| | d3 | 235 | 168 | 0.8 | 30 | 3.6 | 0.5 | 66 | 0.5 | 0.3 | 13 | 1 | 22 |
| | d4 | 121 | 183 | 119 | 0.8 | 5.9 | 0.5 | 42 | 0.4 | 0.2 | 27 | 1 | 37 |
| | d5 | 208 | 243 | 170 | 104 | 2 | 12 | 34 | 0.3 | 0.4 | 32 | 1 | 3 |
| | d6 | 247 | 171 | 203 | 49 | 2.1 | 65 | 36 | 0.4 | 0.1 | 6 | 1 | 2 |

(The underlined indicate outside of the range of the present invention example.)

As is clear from Table 4, the steel sheets D1 to D12 for a container produced by the production method according to the present invention had good corrosion resistance, had high glossiness, and good external appearance. Contrary to this, the steel sheets for a container produced by the production methods according to Comparative Examples d1 to d6 did not have sufficient corrosion resistance or had low glossiness and poor external appearance. In particular, in Comparative Examples d5 and d6 in which the pH of the chemical conversion bath was low, the external appearance was significantly poor as a result of measurement with a gloss meter.

Example 3

First, a steel sheet (base steel sheet) used for a test was prepared. As the steel sheet, a steel sheet used for a general container was used.

Next, a metal chromium layer and a chromium-containing layer were simultaneously formed on the surface of the steel sheet by the following method. Accordingly, a steel sheet for a container was obtained.

The metal chromium layer and the chromium-containing layer were formed by performing an electrolytic treatment in a state where the steel sheet was immersed in a chemical conversion bath having the composition shown in Table 5. The conditions of the electrolytic treatment were as shown in Table 5. The electroless time in this example was set to 0.5 seconds. In addition, "–" for a compound in Table 5 indicates that the compound is not contained. "–" for an electrolytic treatment indicates that no current was applied.

Table 6 shows the configuration of the steel sheet for a container obtained in each example. In addition, the value of each component in Table 6 is a value obtained by performing the measurement according to the method described above.

Furthermore, for the obtained steel sheet for a container, corrosion resistance and glossiness (external appearance) were evaluated as described above. The results are shown in Table 6.

TABLE 5

| | | Chemical conversion step | | | | | | | | Electrolytic treatment | |
|---|---|---|---|---|---|---|---|---|---|---|---|
| | | Chemical conversion bath | | | | | | | Chemical conversion | | |
| | | Trivalent chromium ions (g/L) | Sulfate ions (g/L) | Formate ions (g/L) | Borate ions (g/L) | Chloride ions (g/L) | Potassium ions (g/L) | pH | bath temperature (° C.) | Current density (A/dm²) | Time (sec) |
| | Symbol | | | | | | | | | | |
| Invention Example | E1 | 42 | 82 | 45 | 40 | — | — | 5.4 | 6 | 43 | 2 |
| | E2 | 53 | 96 | 67 | 48 | — | — | 6.4 | 89 | 26 | 10 |
| | E3 | 123 | 94 | 205 | 4 | — | — | 7.0 | 38 | 1 | 5 |
| | E4 | 108 | 134 | 119 | 37 | — | — | 5.1 | 61 | 48 | 4 |
| | E5 | 83 | 242 | 104 | 57 | — | — | 6.2 | 30 | 35 | 0.07 |
| | E6 | 72 | 61 | 63 | 55 | — | — | 5.5 | 29 | 15 | 9 |
| | E7 | 37 | 91 | 26 | 122 | 66 | 14 | 6.7 | 49 | 35 | 4 |
| | E8 | 199 | 115 | 168 | 62 | 66 | 26 | 4.4 | 70 | 34 | 10 |
| | E9 | 214 | 108 | 205 | 46 | 64 | 99 | 4.2 | 73 | 25 | 7 |

TABLE 6

| | | Chromium-containing layer | | | | | Evaluation | |
|---|---|---|---|---|---|---|---|---|
| | | Metal chromium layer Metal Cr | Average particle | Trivalent chromium compound Metal Cr | Metal chromium Metal Cr | Sulfate compound | | |
| | Symbol | content (mg/m$^2$) | size (nm) | content (mg/m$^2$) | content (mg/m$^2$) | S content (mg/m$^2$) | Corrosion resistance | Glossiness |
| Invention Example | E1 | 212 | 79 | 29 | 12 | 8 | 8 | 23 |
| | E2 | 142 | 91 | 16 | 32 | 32 | 9 | 26 |
| | E3 | 345 | 28 | 8 | 38 | 21 | 10 | 36 |
| | E4 | 153 | 99 | 27 | 23 | 23 | 9 | 23 |
| | E5 | 183 | 24 | 32 | 37 | 32 | 8 | 23 |
| | E6 | 297 | 83 | 30 | 16 | 25 | 9 | 35 |
| | E7 | 38 | 54 | 68 | 2 | 15 | 9 | 19 |
| | E8 | 184 | 99 | 17 | 72 | 3 | 8 | 25 |
| | E9 | 124 | 42 | 12 | 6 | 0 | 10 | 28 |

As is clear from Tables 5 and 6, the steel sheets for a container E1 to E9 produced by the production method according to the present invention had good corrosion resistance, high glossiness, and good external appearance.

While the preferred embodiments of the present invention have been described in detail with reference to the accompanying drawings, the present invention is not limited to such examples. It is obvious that those skilled in the art to which the present invention belongs can conceive various changes or modifications within the scope of the technical idea described in the claims, and it is understood that these also naturally belong to the technical scope of the present invention.

INDUSTRIAL APPLICABILITY

According to the present invention, it is possible to provide a steel sheet for a container which can be produced by using trivalent chromium and has good external appearance, particularly good gloss, and corrosion resistance, and a method for producing a steel sheet for a container. Therefore, great industrial applicability is achieved.

The invention claimed is:

1. A steel sheet, comprising:
   a base steel sheet;
   a metal chromium layer consisting of granular metal chromium particles with an average particle size of 10 nm or more and 100 nm or less; and
   a chromium-containing layer,
   wherein the metal chromium layer is located on at least one surface of the base steel sheet,
   the chromium-containing layer is located on the metal chromium layer and contains a granular trivalent chromium compound, or contains a granular trivalent chromium compound and a granular metal chromium,
   the metal chromium layer and the chromium-containing layer are separately disposed in two layers on the base steel sheet,
   in the chromium-containing layer, an average particle size of the trivalent chromium compound and the metal chromium is 10 nm or more and 100 nm or less, and
   an adhesion amount of the chromium-containing layer is 1.0 mg/m2 or more and 100 mg/m2 or less in terms of a Cr content,
   wherein the metal chromium layer and the chromium-containing layer contain a total amount of 6 mg/m$^2$ or more and 80 mg/m$^2$ or less of a sulfate compound in terms of a S content.

2. The steel sheet according to claim 1,
   wherein an adhesion amount of the metal chromium layer is 1.0 mg/m2 or more and 350 mg/m2 or less in terms of the Cr content.

3. The steel sheet according to claim 1,
   wherein the chromium-containing layer contains a sulfate compound in an amount of 0.10 mg/m2 or more and 40 mg/m2 or less in terms of a S content.

4. A method for producing the steel sheet of claim 1, the method comprising:
   a chemical conversion step of treating a base steel sheet with a plurality of chemical conversion baths and forming a metal chromium layer and a chromium-containing layer containing a granular trivalent chromium compound or containing a granular trivalent chromium compound and a granular metal chromium on the metal chromium layer, the metal chromium layer and the chromium-containing layer being separated into two layers on at least one surface of the base steel sheet,
   wherein the plurality of chemical conversion baths contain 0.10 to 250 g/L of trivalent chromium ions, 27 to 250 g/L of sulfate ions, 1.0 to 250 g/L of formate ions, and 1.0 to 150 g/L of borate ions,
   a pH of the plurality of chemical conversion baths is 3.0 or more, and
   an electroless time of 0.1 seconds or longer and 20 seconds or shorter is provided when the base steel sheet is moved between the plurality of chemical conversion baths thereby producing said steel sheet for a container.

5. The method for producing a steel sheet according to claim 4,
   wherein, in the chemical conversion step, a temperature of the plurality of chemical conversion baths is 5° C. or higher and lower than 90° C.

6. The method for producing a steel sheet according to claim 4,
   wherein, in the plurality of chemical conversion baths, the base steel sheet is subjected to an electrolytic treatment at a current density of 0.5 A/dm2 or more and 50 A/dm2 or less for 0.05 seconds or longer and 10 seconds or shorter.

7. The method for producing a steel sheet according to claim 4,
   wherein the plurality of chemical conversion baths further contain 1.0 to 100 g/L of chloride ions and 1.0 to 100 g/L of potassium ions.

8. A container, comprising:
a steel sheet, wherein the steel sheet comprises:
a base steel sheet;
a metal chromium layer consisting of granular metal chromium particles with an average particle size of 10 nm or more and 100 nm or less; and
a chromium-containing layer,
wherein the metal chromium layer is located on at least one surface of the base steel sheet,
the chromium-containing layer is located on the metal chromium layer and contains a granular trivalent chromium compound, or contains a granular trivalent chromium compound and a granular metal chromium,
the metal chromium layer and the chromium-containing layer are separately disposed in two layers on the base steel sheet,
in the chromium-containing layer, an average particle size of the trivalent chromium compound and the metal chromium is 10 nm or more and 100 nm or less, and
an adhesion amount of the chromium-containing layer is 1.0 mg/m$^2$ or more and 100 mg/m$^2$ or less in terms of a Cr content,
wherein the metal chromium layer and the chromium-containing layer contain a total amount of 6 mg/m$^2$ or more and 80 mg/m$^2$ or less of a sulfate compound in terms of a S content.

* * * * *